US008385353B2

(12) United States Patent
Salam et al.

(10) Patent No.: US 8,385,353 B2
(45) Date of Patent: Feb. 26, 2013

(54) CONNECTIVITY FAULT MANAGEMENT (CFM) AUTO-PROVISIONING USING VIRTUAL PRIVATE LAN SERVICE (VPLS) AUTO-DISCOVERY

(75) Inventors: Samer M. Salam, Vancouver (CA); Ali Sajassi, San Ramon, CA (US); Samuel Henderson, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 762 days.

(21) Appl. No.: 12/409,314

(22) Filed: Mar. 23, 2009

(65) Prior Publication Data

US 2010/0238808 A1    Sep. 23, 2010

(51) Int. Cl.
*H04L 12/28* (2006.01)
(52) U.S. Cl. .................... 370/395.53; 370/255
(58) Field of Classification Search .......... 370/241–253, 370/389–395.53
See application file for complete search history.

(56) References Cited

U.S. PATENT DOCUMENTS

| | | | | |
|---|---|---|---|---|
| 7,995,483 | B1 * | 8/2011 | Bayar et al. | 370/241.1 |
| 2009/0109837 | A1 * | 4/2009 | Kini et al. | 370/216 |
| 2009/0109861 | A1 * | 4/2009 | Kini et al. | 370/242 |
| 2009/0168663 | A1 * | 7/2009 | Friskney et al. | 370/254 |
| 2009/0285089 | A1 * | 11/2009 | Srinivasan | 370/218 |

OTHER PUBLICATIONS

Fowler et al., "Service OAM: Discovery & Synchronization of Peer MEPs", Metro Ethernet Forum, Technical Committee, Jul. 2008, 15 pages.

Mohan et al., "L2VPN OAM Requirements and Framework draft-ietf-l2vpn-oam-req-frmk-10.txt", Internet-Draft, L2VPN Working Group, Jul. 14, 2008, 37 pages.
Rosen et al., "Provisioning, Autodiscovery, and Signaling in L2VPNs draft-ietf-l2vpn-signaling-08.txt", Internet-Draft, Network Working Group, May 3, 2006, 40 pages.
White Paper, "Ethernet Operations, Administration, and Maintenance", Cisco Systems, Sep. 2007, 15 pages.
Sangli et al., "BGP Extended Communities Attribute", RFC 4360, Network Working Group, Feb. 2006, 13 pages.
Rosen et al., "BGP/MPLS IP Virtual Private Networks (VPNs)", RFC 4364, Network Working Group, Feb. 2006, 48 pages.
Kompella et al., "Virtual Private LAN Service (VPLS)Using BGP for Auto-Discovery and Signaling", RFC 4761, Network Working Group, Jan. 2007, 29 pages.

* cited by examiner

*Primary Examiner* — Ricky Ngo
*Assistant Examiner* — Ben H Liu
(74) *Attorney, Agent, or Firm* — Hickman Palermo Truong Becker Bingham Wong LLP

(57) ABSTRACT

Connectivity Fault Management (CFM) auto-provisioning using Virtual Private LAN Service (VPLS) auto-discovery is described. In one embodiment, an apparatus comprises VPLS logic and configuration logic. The VPLS logic is operable at least to receive and send configuration information for a VPLS instance, where the configuration information comprises: a first value that uniquely identifies the VPLS instance; and a plurality of second values that respectively and uniquely identify a plurality of network elements that are operable to provide the VPLS instance. The configuration logic is operable at least to automatically configure, based on the first value and on the plurality of second values, a CFM association and a local maintenance endpoint (MEP) for the VPLS instance on the apparatus.

24 Claims, 3 Drawing Sheets

CONNECTIVITY FAULT MANAGEMENT (CFM) AUTO-PROVISIONING USING VIRTUAL PRIVATE LAN SERVICE (VPLS) AUTO-DISCOVERY

TECHNICAL FIELD

The present disclosure generally relates to network management.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The Connectivity Fault Management (CFM) protocol is an Ethernet service layer operations, administration and management (OAM) protocol that is specified in the IEEE 802.1ag-2007 standard. The CFM protocol provides: discovery and verification of the paths, through bridges and local area networks (LANs), taken for frames addressed to and from specified network nodes; detection of connectivity faults on the communication links that form the paths; and isolation of the connectivity faults to specific bridges or LANs. While the CFM protocol provides the operation, administration, and maintenance functions in terms of fault management and connectivity monitoring, the CFM protocol is provisioning-intensive because it requires manual configuration of an extensive list of parameters on every network node that is included in a CFM maintenance association.

For example, in order to provision the CFM protocol for a CFM association that includes multiple network elements, a user or application must login at each network element and must configure the necessary CFM parameters on each network element. Some examples of the CFM parameters that must be configured on each network element include, without limitation, a maintenance level, a maintenance association identifier, a maintenance endpoint identifier for the local network element, and the list of the maintenance endpoint identifiers of all other network elements that participate in the CFM association. For a CFM association that includes a large number of network elements, configuring the CFM protocol is a significant problem because each network element must be configured not only with its own CFM parameters, but also with CFM parameters that pertain to all other network elements that participate in the association. This problem is further exacerbated by the fact that the CFM protocol does not itself provide a mechanism for automatically maintaining the intended set of network elements that participate in an already established and functioning CFM association. Rather, when a network element is added to or is taken out of a CFM association for whatever reason, a user must manually reconfigure each and every other network element that participates in that CFM association. This manual maintenance of the set of network elements that participate in a CFM association is a tedious, error-prone, and time-consuming task, especially for CFM associations which include a large number of network elements and/or which experience frequent topology changes.

DETAILED DESCRIPTION

Figure 1:
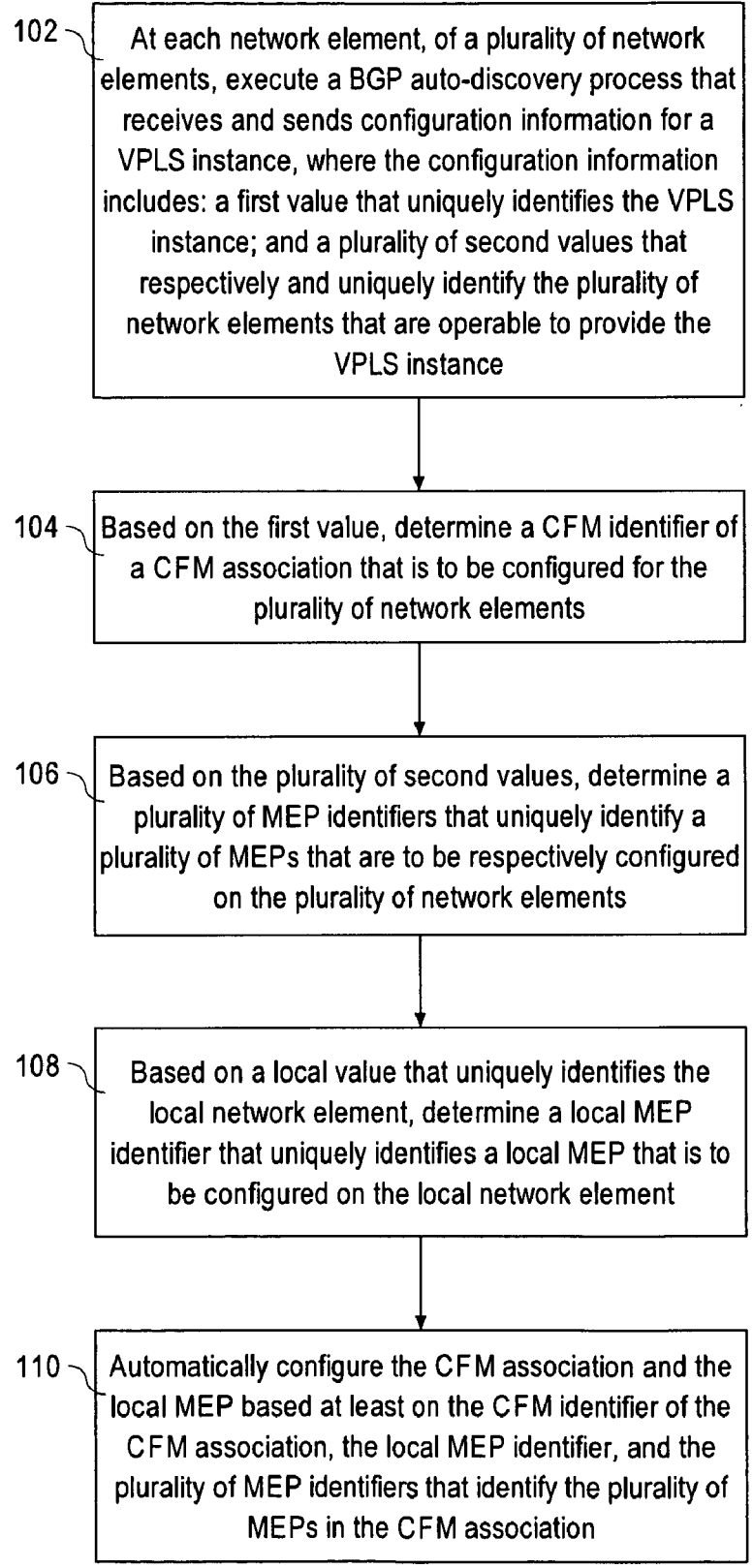
FIG. 1 is a flow diagram that illustrates a method for CFM auto-provisioning according to an example embodiment.

Connectivity Fault Management (CFM) auto-provisioning using Virtual Private LAN Service (VPLS) auto-discovery is described. In the following description, for the purposes of explanation, numerous specific details are set forth in order to provide a thorough understanding of the techniques described herein. It will be apparent, however, to one skilled in the art that the present techniques may be practiced without these specific details. In other instances, well-known structures and devices are shown in block diagram form in order to avoid unnecessarily obscuring the techniques described herein.

Embodiments are described herein according to the following outline:

1.0 General Overview
2.0 Overview of BGP Auto-Discovery for VPLS
3.0 Techniques for CFM Auto-Provisioning
   3.1 Functional Description of an Example Embodiment
   3.2 Structural Description of an Example Embodiment
   3.3 Mapping Function for Generating MEP IDs
   3.4 Additional Features and Other Example Embodiments
4.0 Implementation Mechanisms—Hardware Overview
5.0 Extensions and Alternatives

1.0 General Overview

Described herein are techniques for automatically provisioning a CFM protocol on network elements that participate, or need to be configured to participate, in a CFM maintenance association. The automatic provisioning of a CFM protocol on a network element is also referred to herein as "CFM auto-provisioning", and a CFM maintenance association is also referred to as a "CFM association".

According the techniques described herein, an out-of-band auto-provisioning mechanism relies on a protocol (and on the data carried in protocol messages) that is completely different from CFM in order to derive the CFM configuration of any particular network element that participates in a given CFM association. By providing an out-of-band auto-provisioning mechanism, the techniques described herein ensure that a CFM service can be automatically configured and started on the network elements participating in a CFM association without requiring a user to perform manual configurations and without requiring a CFM protocol to be pre-configured on any network elements in the association.

In an example operational context, the techniques described herein provide for CFM auto-provisioning of network elements that provide a VPLS instance over one or more networks. In this operational context, the techniques described herein use VPLS information, which is distributed over a Border Gateway Protocol (BGP) protocol, to derive the CFM parameters that are automatically configured on each network element that participates in providing the VPLS instance. The VPLS information is distributed among the network elements through a BGP auto-discovery process, which allows the network elements to automatically discover each other and to create and maintain a full mesh of pseudowires among each other in order to support the VPLS instance. The techniques described herein make use of this VPLS information in order to automatically configure a CFM maintenance endpoint (MEP) on each network element. For example, each and every network element applies the same CFM auto-provisioning logic to the same VPLS information that is distributed among all network elements over the BGP auto-discovery process. In this manner, the techniques described herein ensure that each and every network element will derive the same set of CFM parameters for the CFM auto-provisioning, including the same list of MEP identifiers that uniquely identify the network elements that are going to participate in the CFM association being set up.

In an example embodiment, an apparatus comprises at least one or more processors, VPLS logic, and configuration logic. The VPLS logic is operable at least to execute a BGP auto-discovery process that receives and sends configuration information for a VPLS instance. The configuration information for the VPLS instance comprises a first value that uniquely identifies the VPLS instance, and a plurality of second values that respectively and uniquely identify a plurality of network elements that are operable to provide the VPLS instance over one or more networks. The configuration logic is operable to determine, based on the first value, a CFM identifier of a CFM association that is to be configured for the plurality of network elements. Based on the plurality of second values, the configuration logic is operable to determine a plurality of MEP identifiers that uniquely identify a plurality of MEPs, in the CFM association, that are to be respectively configured on the plurality of network elements. Based on a local value that uniquely identifies the apparatus in the VPLS instance, the configuration logic is operable to determine a local MEP identifier that uniquely identifies, in the CFM association, a local MEP that is to be configured at the apparatus. The configuration logic is also operable to automatically configure the local MEP on the apparatus based at least on the CFM identifier of the CFM association, the local MEP identifier, and the plurality of MEP identifiers that uniquely identify the plurality of remote MEPs in the CFM association. In this example embodiment, the apparatus may be a network element or device, such as a router.

In other embodiments, the techniques for CFM auto-provisioning encompass a computer-readable medium configured with executable instructions and a method for performing CFM auto-provisioning as described herein.

It is noted that the techniques described herein for CFM auto-provisioning are not limited to being implemented on a router, in the operational context of VPLS, and/or based on information that is distributed over a BGP protocol. Rather, in various embodiments the techniques described herein may be implemented on any suitable types of network infrastructure elements or computer systems, in various operational contexts in which CFM may be useful, and based on information that is distributed out-of-band over various suitable protocols. Thus, examples of network element types, operational contexts, and out-of-band protocols provided herein are to be regarded in an illustrative rather than a restrictive sense.

2.0 Overview of BGP Auto-Discovery for VPLS

An instance of VPLS (also referred to herein as "VPLS instance") appears in almost all respects as an Ethernet LAN to customers of a Service Provider (SP). However, in a VPLS instance, the customers are not all connected to a single LAN, but instead may be spread across a metro or wide area. In essence, a VPLS instance "glues" together several individual LANs across a packet-switched network to appear and function as a single LAN. This is accomplished by incorporating MAC address learning, flooding, and forwarding functions in the context of pseudowires that connect these individual LANs across the packet-switched network.

From the perspective of customer edge (CE) devices (e.g., routers and the like), VPLS is a "LAN Service" in that CE devices that belong to a given VPLS instance can interact through the SP network as if they were connected by a LAN. A VPLS instance is "private" in that CE devices that belong to different VPLS instances cannot interact. A VPLS instance is "virtual" in that multiple VPLSs can be offered over a common packet-switched network and over common network elements. Provider edge (PE) devices (e.g., network elements in a SP network, such as routers) interact to discover all the other PE devices that participate in the same VPLS instance. These interactions are performed at the VPLS control planes in the PE devices.

There are two main functions of a VPLS control plane: auto-discovery of network elements participating in a given VPLS instance, and setup and teardown (also referred to as "signaling") of the pseudowires that constitute that VPLS instance. RFC 4761 describes how both the auto-discovery function and the signaling function operate over BGP. Both of these functions may be accomplished with a single BGP UPDATE message that includes the necessary information in one or more Network Layer Reachability Information (NLRI) attributes within the message. When performed, the signaling function sets a full mesh of pseudowires among the network elements in the VPLS instance, where a single pseudowire is created between each pair of network elements that participate in the VPLS instance.

The auto-discovery function of the VPLS service may be performed by a BGP auto-discovery process. As used herein, "BGP auto-discovery process" refers to one or more software and/or hardware components, which are allocated computational resources, such as memory, CPU time, and/or disk storage space and which are operable to process information included in BGP messages in order to determine and identify all other network elements that participate in a given VPLS instance. A BGP auto-discovery process may be integrated within a BGP process that performs regular BGP operations; alternatively, a BGP auto-discovery process may be executed separately over VPLS information that is distributed over a BGP protocol. Based on the VPLS information distributed over the BGP protocol, each network element executing a BGP auto-discovery process discovers which other network elements are part of a given VPLS instance.

For the purpose of establishing a VPLS instance over a set of network elements, the VPLS information is distributed to all network elements in NLRI attributes that are included in BGP messages (e.g., in BGP UPDATE messages). The VPLS information includes at least: a globally unique identifier that uniquely identifies the VPLS instance; and a list of Virtual Switching Instance (VSI) identifiers that uniquely identify the VSIs that participate in the VPLS instance. A VSI is a network interface logic comprising of one or more software and/or hardware components that are operable to send and receive data units (e.g., packets, frames, etc.) over the pseudowires that form the VPLS instance. A VSI is established in a network element and is coupled to the pseudowires established for that network element for a given VPLS instance. Thus, a network element may have multiple VSIs, where each VSI participates in a different VPLS instance that is supported by that network element. On a given network element, each VSI is configured with the globally unique VPLS identifier that identifies the VPLS instance to which that VSI belongs. Each VSI is also configured with a VSI identifier that is unique within the VPLS instance to which that VSI belongs. In some VPLS implementations, the VSI identifier of each VSI in a given VPLS instance may be formed by concatenating the VPLS identifier of that VPLS instance and the IP address of the network element on which that VSI is configured. In this manner, the VSI identifiers of all VSIs in the VPLS instance may be automatically derived from the VPLS identifier of the VPLS instance and the IP addresses of all network elements over which the VPLS instance is established. Other VPLS implementations may use other numbering schemes to form the VSI identifiers (including schemes that rely on user-configured VSI identifiers) so long as each VSI is assigned an identifier that is unique within the VPLS instance to which that VSI belongs.

3.0 Techniques for CFM Auto-Provisioning 3.1 Functional Description of an Example Embodiment FIG. 1 is a flow diagram that illustrates an example method for CFM auto-provisioning according to the techniques described herein. In one operational context, the method illustrated in FIG. 1 is performed at each network element that is operable to provide a VPLS instance over one or more networks, such as Service Provider (SP) network(s).

As used herein, "network infrastructure element" (also referred to herein as just "network element") refers to a networking device that is operable to manage network traffic transmitted in one or more networks. Typically, a network element is operable to receive packet flows on its network interfaces from other network elements, make a routing or forwarding decision regarding the received packet flows, and transmit the received packet flows on the network interfaces based on the decision. Examples of network elements include, but are not limited to, routers, switches, bridges, and hubs.

In step 102 each network element, of a plurality of network elements, executes a BGP auto-discovery process. The network elements are collectively configurable and operable to provide a VPLS instance over one or more networks. The BGP auto-discovery process receives and sends configuration information for the VPLS instance. For example, the BGP auto-discovery process at a given network element may receive (or be notified of the receipt of) and may send (or cause to be send) BGP UPDATE messages to and from other network elements, where the BGP UPDATE messages carry the VPLS configuration information in one or more NLRI attributes. The VPLS configuration information includes a first value that uniquely identifies the VPLS instance such as, for example, a unique VPLS ID. The VPLS configuration information also includes a plurality of second values that respectively and uniquely identify the other network elements that provide, or are to be configured to provide, the VPLS instance. The plurality of second values may be, for example, a list of VSI IDs that uniquely identify the VSIs on the other network elements that provide the VPLS instance.

Based on the first value received in the VPLS configuration information by the BGP auto-discovery process, in step 104 each network element determines a CFM identifier (also referred to as CFM maintenance association identifier, or MAID) of a CFM association that is to be configured for the plurality of network elements. As used herein, a CFM association (also referred to as "CFM maintenance association") refers to a set of maintenance endpoints within an administrative domain for the purpose of managing and administering a service within a network, where depending on the domain type the administrative domain may include various network nodes such as, for example, various network infrastructure elements and/or various customer-side networked devices (e.g., routers, switches, servers, workstations, user laptops, etc.). In some implementations, the VPLS ID that is distributed in the VPLS configuration information may be used as the CFM identifier of a CFM association that is to be set up for monitoring the pseudowires that comprise the VPLS instance identified by the VPLS ID. In other implementations, a value that is derived from the VPLS ID in a unique manner may be used as the CFM identifier of the CFM association.

Based on the plurality of second values received in the VPLS configuration information by the BGP auto-discovery process, in step 106 each network element determines a plurality of maintenance endpoint identifiers that uniquely identify a plurality of maintenance endpoints that are to be respectively configured on the plurality of network elements. As used herein, a maintenance endpoint (MEP) refers to an association of a physical port on a network element with a CFM logic in the network element, where the CFM logic is operable to provide a CFM service over the associated physical port. In some embodiments, a mapping function may be applied to the list of VSI IDs that is distributed in the VPLS configuration information in order to obtain the plurality of CFM identifiers that identify the corresponding MEPs on the plurality of network elements. For example, the mapping function may take as input the list of VSI IDs and may generate a corresponding list of MEP IDs, where each MEP ID in the list uniquely identifies a separate one MEP that is to be established on a separate one of the plurality of network elements.

According to the CFM auto-provisioning techniques described herein, each network element applies the same mapping function to the same VPLS configuration information—for example, to the same list of VSI IDs that is distributed by the BGP auto-discovery process that runs on each network element. This allows each network element, of the plurality of network elements for which the CFM association is being auto-provisioned, to derive the same MEP IDs for the same corresponding MEPs that are to be configured on the network elements. In this manner, the techniques described herein allow each network element to separately and independently derive the same MEP IDs of the MEPS on the other network elements for which the CFM association is being configured.

Based on a local value that uniquely identifies each local network element, in step 108 each network element determines a local MEP identifier that uniquely identifies a local MEP that is to be automatically configured on that network element. For example, a mapping function may be applied to a VSI ID that identifies a VSI that is configured (or to be configured) on the local network element to support the VPLS instance identified in the VPLS configuration information that is distributed by a BGP auto-discovery process on the network element. The mapping function must necessarily be the same function which is applied to derive the MEP IDs of the MEPs that are to be configured on the other network elements that support the VPLS instance. It is noted that the local value (e.g., a local VSI ID) that identifies each local network element is advertised by the BGP auto-discovery process on that local network element to the other network elements that participate in the VPLS instance. In this manner, by using the BGP auto-discovery process, each network element learns a unique identifier of each other network element that is to participate in the VPLS instance. In accordance with the techniques for CFM auto-provisioning described herein, the list of unique identifiers is then used by each network element to derive a list of unique MEP IDs for the MEPs that are to be configured on the other network elements.

In step 110, a CFM association and a local MEP are automatically configured on each network element based at least on the CFM parameters that are automatically determined from the VPLS configuration information that is received by the BGP auto-discovery process on that network element. For example, to configure the CFM association and the local MEP, each network element uses the CFM identifier of the CFM association (e.g., the MAID determined from the VPLS ID), the local MEP identifier (e.g., the MEP ID determined from the local value that uniquely identifies the local network element), and the plurality of MEP identifiers that identify the plurality of MEPs that are to be configured on the other network elements (e.g., the list of MEP IDs determined from the list of VSI IDs of the other network elements).

In addition, in some embodiments other CFM parameters may be automatically configured. For example, default values may be used to set the CFM maintenance level and the CFM domain name of the CFM association that is established over the plurality of network elements. The CFM maintenance level indicates the position of the CFM association in a set of hierarchically nested CFM domains. The default value used for the CFM maintenance level may be a default value specified in the CFM protocol specification, or any other value that is commonly pre-configured on all the network elements.

The CFM domain name uniquely identifies a network or part of a network for which faults in connectivity can be managed. The default value used for the CFM domain name may be a NULL value, or any other value that is commonly pre-configured on all the network elements. In some embodiments, the VPLS ID of a VPLS instance may be constructed as the tuple <BGP-ASN:VFI-VPN-ID>, where the "BGP-ASN" field indicates a BGP community associated with the VPLS instance, and the "VFI-VPN-ID" field indicates a virtual forwarding instance operable to forward packets over the pseudowire that comprise the VPLS instance. In these embodiments, the value in the "VFI-VPN-ID" field of the VPLS ID may be used as a Format 4 CFM Short Maintenance Association Name as defined in the CFM protocol, while the CFM domain name itself may be kept NULL for simplicity.

3.2 Structural Description of an Example Embodiment

Figure 2:
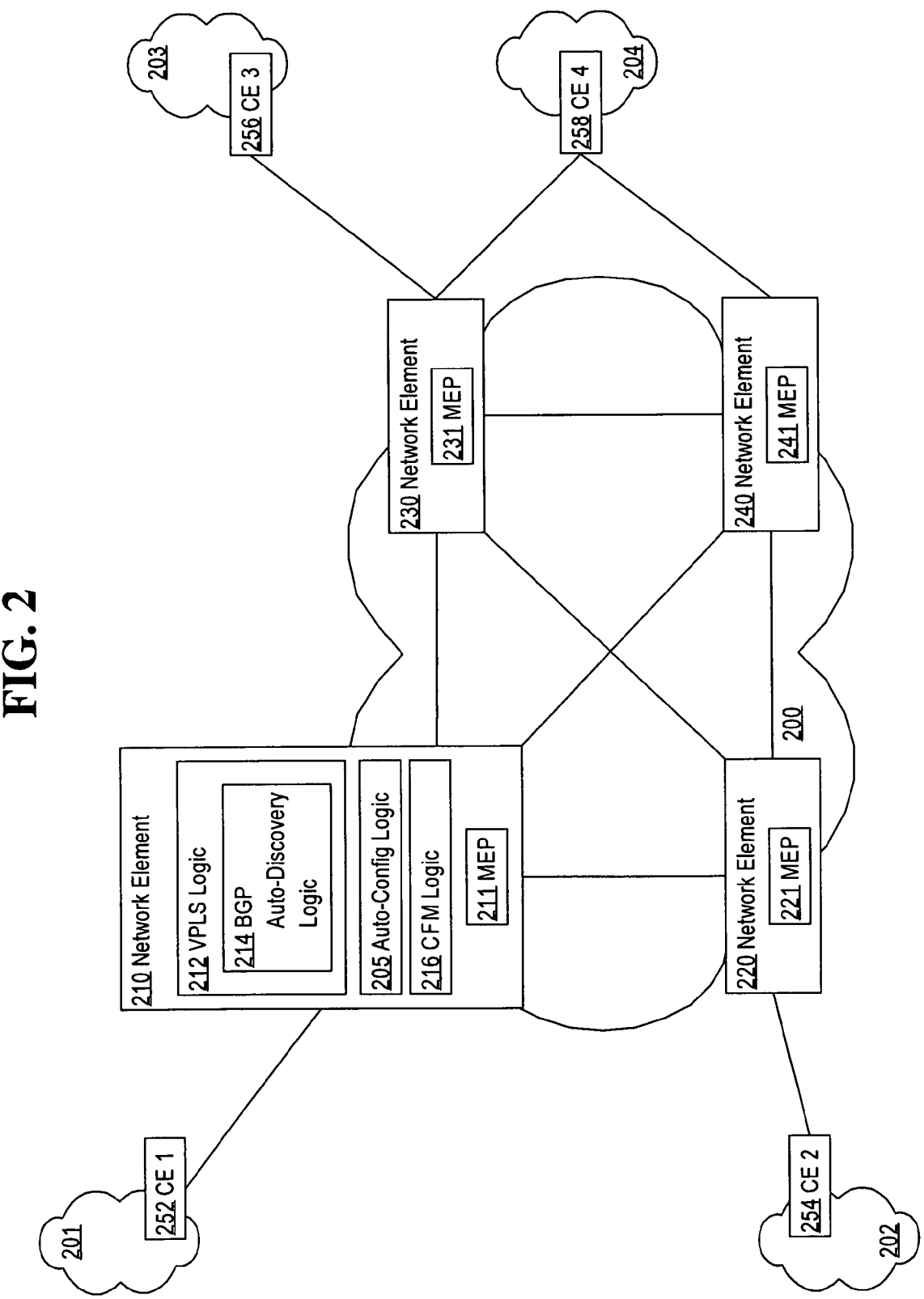
FIG. 2 is a block diagram that illustrates an example operational context and example network elements operable to auto-provision a CFM protocol according to one embodiment.

FIG. 2 is a block diagram that illustrates an example operational context and example network elements operable to auto-provision a CFM protocol in accordance with the techniques described herein. Each of network elements 210, 220, 230, and 240 in service provider network 200 comprises VPLS logic, BGP auto-discovery logic, CFM auto-configuration logic, and CFM logic.

As used herein, "logic" refers to a set of instructions which, when executed by one or more processors, are operable to perform one or more functionalities. In various embodiments and implementations, any such logic may be implemented as one or more software components that are executable by one or more processors, as one or more hardware components such as Application-Specific Integrated Circuits (ASICs), or as any combination of one or more software and hardware components.

VPLS logic 212 is operable to establish VPLS instances on network element 210. For example, VPLS logic 212 may be operable to set up local VSIs, to process VPLS configuration information, and to establish pseudowires to other network elements (such as network elements 220, 230, and 240) for one or more VPLS instances that are supported by network element 210. VPLS logic 212 may establish pseudowires for the supported VPLS instances over Multiprotocol Label Switching (MPLS) tunnels that are configured to other network elements. In operation, for each supported VPLS instance, VPLS logic 212 is also operable to receive and send packets over the MPLS tunnels, and to distinguish and demultiplex the packets belonging to each the VPLS instance from other packets that belong to other MPLS services.

In network element 210, BGP auto-discovery logic 214 is operable to execute a BGP auto-discovery process. For illustration purposes only, FIG. 2 shows that BGP auto-discovery logic 214 is included in VPLS logic 212. However, in various embodiments and implementations, the functionalities of BGP auto-discovery logic 214 and VPLS logic 212 may be implemented in the same integrated module, or may be combined in two or more modules or hardware components that may provide some additional functionality. Thus, the depiction in FIG. 2 of BGP auto-discovery logic 214 as being included in VPLS logic 212 is to be regarded in an illustrative rather than a restrictive sense.

BGP auto-discovery logic 214 is operable to process information included in BGP messages in order to determine and identify all other network elements that participate in a given VPLS instance that is supported at network element 210. BGP auto-discovery logic 214 may be integrated within a BGP logic that performs regular BGP operations. Alternatively, BGP auto-discovery logic 214 may execute a separate process over VPLS information that is distributed over a BGP protocol by a regular BGP process. Based on the VPLS information distributed over the BGP protocol, BGP auto-discovery logic 214 is operable to discover which other network elements are part of a given VPLS instance. BGP auto-discovery logic 214 is also operable to advertise or cause to be advertised any VPLS configuration information of network element 210, such as, for example, the VSI IDs of the VSIs that provide the various VPLS instances supported on network element 210. For example, BGP auto-discovery logic 214 may be operable to process BGP UPDATE messages and the NLRI attributes included therein, and to extract the VPLS configuration information carried in the NLRI attributes.

Auto-configuration logic 205 is operable to configure one or more CFM maintenance associations and one or more MEPs on network element 210 in accordance with the techniques for CFM auto-provisioning described herein. Based on the VPLS ID that is received by BGP auto-discovery logic 214, auto-configuration logic 205 is operable to determine a CFM identifier of a CFM association that would include a MEP configured locally on network element 210. Based on a list of VSI IDs that is received by BGP auto-discovery logic 214, auto-configuration logic 205 is operable to determine a list of MEP IDs for MEPs that are to be configured on the other network elements that are going to participate in the CFM association. For example, auto-configuration logic 205 may execute a mapping function over the list of VSI IDs in order to derive a corresponding list of MEP IDs for the MEPs on the other network elements in the CFM association. Auto-configuration logic 205 is also operable to determine a MEP identifier of the local MEP based on a VSI identifier that identifies a local VSI on network element 210. For example, auto-configuration logic 205 must necessarily execute the same mapping function over the local VSI ID in order to obtain the MEP ID of the local MEP. Auto-configuration logic 205 is also operable to automatically configure the CFM association and the local MEP on network element 210 based at least on: the CFM identifier of the CFM association, the local MEP ID, and the list of MEP IDs that identify the MEPs that are to be configured on the other network elements participating in the CFM association.

In some embodiments, a network element may further include logic that is operable to invoke the auto-configuration logic in response to receiving a message that includes VPLS configuration information. For example, BGP auto-discovery logic 214 in network element 210 may be operable to invoke auto-configuration logic 205 in response to receiving a BGP UPDATE message that includes VPLS configuration information in the form of NLRI attributes that store a VPLS ID and a list of VSI IDs of VSIs on remote network elements, such as network elements 220, 230, or 240.

CFM logic 216 is operable to execute a CFM service through the local MEP after the CFM association and the local MEP are automatically configured on network element 210 by auto-configuration logic 205. As used herein, "CFM service" refers to a service or functionality that is provided over a CFM protocol. For example, the CFM service provided by CFM logic 216 may include connectivity monitoring for the pseudowires over which a VPLS instance is established. According to the CFM protocol, the connectivity monitoring functionality may include periodically sending continuity check messages from the local MEP in order to detect whether loss of connectivity has occurred on the pseudowires to the other network elements. The CFM service provided by CFM logic 216 may also include fault verification for the pseudowires over which a VPLS instance is established. According to the CFM protocol, the fault verification functionality may include sending messages from the local MEP over a pseudowire to another MEP in the CFM association in order to determine whether the other MEP is reachable or not. The CFM service provided by CFM logic 216 may also include fault isolation for the pseudowires over which a VPLS instance is established. According to the CFM protocol, the fault isolation functionality may include sending messages from the local MEP over the pseudowire to other MEPs in the CFM association in order to track the hop-by-hop path to another MEP and to discover connectivity information about the path.

In one operational example, suppose that network elements 210, 220, 230, and 240 in service provider network 200 are configured (or are going to be configured) to provide a VPLS instance V for network nodes established in customer networks 201, 202, 203, 204. As illustrated in FIG. 2, network element 210 is a PE device that is communicatively connected to CE device 252 in network 201. Network element 220 is a PE device that is communicatively connected to CE device 254 in network 202. Network element 230 is a PE device that is communicatively connected to CE device 256 in network 203 and to CE device 258 in network 204. Network element 240 is a PE device that is communicatively connected to CE device 258 in network 204. In order to provide VPLS instance V, a full mesh of pseudowires is set up (or is going to be set up) among network elements 210, 220, 230, and 240, for example by the VPLS logic that executes on each of the network elements. A single pseudowire is created between each pair of network elements 210, 220, 230, and 240. The pseudowires may be established over Multiprotocol Label Switching (MPLS) tunnels that are configured among network elements 210, 220, 230, and 240, where VPLS pseudowire labels in packets exchanged through the MPLS tunnels are used to demultiplex the packets belonging to the VPLS instance and other packets that belong to other MPLS services such as VPN.

From the perspective of CE devices 252, 254, 256, and 258, the VPLS instance V appears and functions as a single LAN. That is, each of CE devices 252, 254, 256, and 258 can interact with each other through service provider network 200 as if they were connected by a LAN. This is accomplished by incorporating MAC address learning, flooding, and forwarding functions in the context of pseudowires that connect the individual networks 201, 202, 203, and 240 through network elements 210, 220, 230, and 240 across service provider network 200. During the set up phase of the VPLS instance V, and before the VPLS instance is established and configured, network elements 210, 220, 230, and 240 can interact to discover each other through the BGP auto-discovery logic that is executed on each network element. For example, each of network elements 210, 220, 230, and 240 may execute a BGP auto-discovery process that advertises its own VPLS configuration information (e.g., the VSI ID of the local VSI), and also advertises and/or receives VPLS configuration information (e.g., VPLS ID and VSI IDs of VSIs on other network elements) in NLRI attributes in BGP UPDATE messages.

According to the techniques described herein, each of network elements 210, 220, 230, and 240 executes the same auto-configuration logic over the same VPLS configuration information in order to automatically configure a local MEP that is to participate in CFM association C that is established for the purpose of connectivity fault monitoring and management over the pseudowires that comprise VPLS instance V.

For example, auto-configuration logic 205 in network element 210 may automatically configure MEP 211 based on the VPLS configuration information for VPLS instance V. Auto-configuration logic 205 first determines a CFM identifier of the CFM association C based on the VPLS ID of VPLS instance V. Auto-configuration logic 205 then determines a list of MEP IDs for the MEPs that are to be configured on network elements 220, 230, and 240 by executing a mapping function on the list of VSI IDs of the VSIs that participate in VPLS instance V. Auto-configuration logic 205 then determines a MEP identifier of the local MEP 211 by executing the same mapping function on a VSI identifier that identifies a local VSI on network element 210. Auto-configuration logic 205 then automatically configures MEP 211 by setting up at network element 210 a MEP configuration that includes the CFM identifier of the CFM association, the local MEP ID, and the list of MEP IDs that identify the other MEPs that participate in CFM association C.

The auto-configuration logic on each of network elements 220, 230, and 240 operates in a similar manner and uses the same VPLS configuration information for VPLS instance V in order to configure a MEP on each of these network elements. For example, the auto-configuration logic on network element 220 automatically configures MEP 221 on that network element. The auto-configuration logic on network element 230 automatically configures MEP 231 on that network element. The auto-configuration logic on network element 240 automatically configures MEP 241 on that network element.

In this manner, by executing the same auto-configuration logic on the same VPLS configuration information, each of network elements 210, 220, 230, and 240 is capable of separately and independently learning the exact same list of MEP IDs (including the MEP ID for its own MEP) as the list of MEP IDs learned by each other network element. This allows each of network elements 210, 220, 230, and 240 to automatically configure its CFM association and local MEP, which in turn results in the auto-provisioning of the CFM association C that includes the MEPs configured on these network elements. After the CFM association C is auto-provisioned in this manner, MEPs 211, 221, 231, and 241 may initialize and provide one or more CFM services in CFM association C in accordance with the CFM protocol.

3.3 Mapping Function for Generating MEP IDs

According to the techniques described herein, all network elements that provision MEPs in the same CFM association use the same mapping function in order to derive the list of MEP IDs that identify the MEPs in the association. The mapping function, as executed on each network element, takes as input VPLS configuration information and returns a list of MEP IDs. Each MEP ID in the returned list of MEP IDs uniquely identifies one MEP that is going to be automatically configured to participate in the CFM association. In some embodiments, the mapping function may return a list of mappings, where each mapping includes a MEP ID that uniquely identifies a MEP in the CFM association and a value that uniquely identifies a network element that is associated with that MEP ID.

In some embodiments, the mapping information may take as input a list of VSI IDs, where the list of VSI IDs includes: (1) the list of VSI IDs that is included in the VPLS configuration information that is distributed by a BGP auto-discovery process; and (2) the VSI ID of a VSI that is local to the network element that executes the mapping function. In these embodiments, the mapping function returns a list of MEP IDs that includes: (1) the generated list of MEP IDs for the MEPs that are to be configured on the other network elements; and (2) the generated MEP ID of the MEP that is to be configured on the local network element. In other embodiments, the mapping function may be executed separately for the list of VSI IDs received in the VPLS configuration information and for the VSI ID that identifies the VSI on the local network element. In yet other embodiments, the mapping function may be executed separately for each VSI ID, including the VSI IDs received in the VPLS configuration information and the local VSI ID. Thus, the mapping function is not restricted to being executed in any particular manner, and for this reason the examples described herein for executing the mapping function are to be regarded in an illustrative rather than a restrictive sense.

In one embodiment, the VSI IDs included in the VPLS configuration information that is distributed by a BGP auto-discovery process include the Layer 2 (L2) Router IDs of the remote network elements that are configured to provide a VPLS instance. A L2 Router ID included in a VSI ID uniquely identifies a network element in the context of the VPLS instance. In this embodiment, the mapping function uses the L2 Router ID of a network element to generate a corresponding MEP ID that uniquely identifies a MEP on that network element.

In one embodiment, the mapping function may arrange in a particular pre-determined order the list of L2 Router IDs that are extracted from the VSI IDs that are included in the VPLS configuration information. The order may be, for example, an ascending order or a descending order. The mapping function may then generate the list of MEP IDs my assigning consecutive numbers as the MEP IDs that match the pre-determined order. In this manner, the mapping function ensures that each MEP in the CFM association will get a unique MEP ID. It is noted that so long as all network element share the same mapping function and execute that function on the same set of data (e.g., VSI IDs or L2 Router IDs), each network element would derive the same MEP IDs for the same corresponding MEPs in the CFM association.

In one embodiment, the VSI IDs included in the VPLS configuration information that is distributed by a BGP auto-discovery process may include Router IDs of the remote network elements, where the Router IDs are the IP addresses of the network elements. In this embodiment, the Router IDs may be assigned sequentially to the network elements. Thus, from the received list of VSI IDs, a mapping function may take the lower 13 bits from each Router ID in order to generate a list of MEP IDs in the range of 1 to 8191 as specified in the CFM protocol.

In one embodiment, the mapping function may be a hashing function that is operable to generate a list of unique MEP IDs from the list of VSI IDs that is included in the VPLS configuration information distributed by a BGP auto-discovery process. The hashing function may be implemented in various ways so long as it generates a unique MEP ID for each MEP in the CFM association.

3.4 Additional Features and Other Example Embodiments

The techniques described herein allow the auto-provisioning of one MEP per VPLS instance per network element. In some operational contexts, a network element may support multiple VPLS instances, and the techniques described herein allow the network element to auto-configure one MEP per each VPLS instance.

According to the techniques described herein, the locality where a MEP is placed within the network element may depend on the particular implementation or on the particular operational context. Depending on the locality, a MEP may be upward-facing (Up MEP) or downward-facing (Down MEP).

A Down MEP is operable to be associated with one or more pseudowires of the VPLS instance for which a CFM association is being configured on a network element. For example, a Down MEP may be configured on an emulated LAN interface that connects a VPLS bridge module to a VPLS forwarder logic that is operable to transmit frames and/or packets on the pseudowires of the VPLS instance. Thus, the Down MEP communicates on the pseudowires through a virtual network interface that is not physically present on the network element.

An Up MEP is operable to be associated with one or more network interfaces of the network element on which the MEP is configured. For example, an Up MEP may be configured on an attachment circuit of the network element, where the attachment circuit connects the physical network interfaces of the network element to a VPLS bridge module.

4.0 Implementation Mechanisms—Hardware Overview

Figure 3:
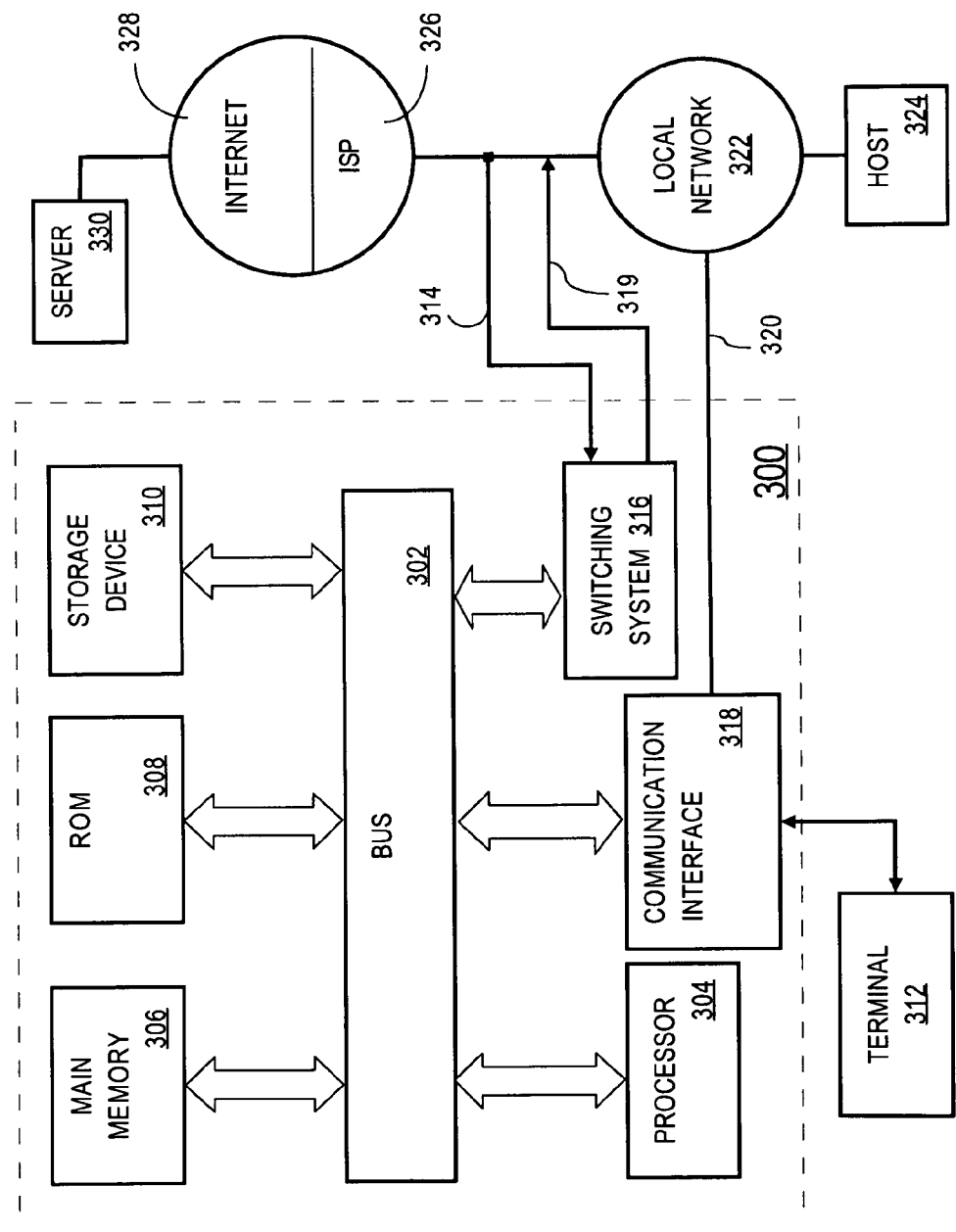
FIG. 3 is a block diagram that illustrates an example computer system on which embodiments may be implemented.

FIG. 3 is a block diagram that illustrates a computer system 300 upon which an embodiment of the techniques described herein for CFM auto-provisioning may be implemented. The preferred embodiment is implemented using one or more computer programs running on a network element such as a router device. Thus, in this embodiment, the computer system 300 is a router.

Computer system 300 includes a bus 302 or other communication mechanism for communicating information, and a processor 304 coupled with bus 302 for processing information. Computer system 300 also includes a main memory 306, such as a random access memory (RAM), flash memory, or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk, flash memory or optical disk, is provided and coupled to bus 302 for storing information and instructions.

A communication interface 318 may be coupled to bus 302 for communicating information and command selections to processor 304. Interface 318 is a conventional serial interface such as an RS-232 or RS-422 interface. An external terminal 312 or other computer system connects to the computer system 300 and provides commands to it using the interface 318. Firmware or software running in the computer system 300 provides a terminal interface or character-based command interface so that external commands can be given to the computer system.

A switching system 316 is coupled to bus 302 and has an input interface 314 and an output interface 319 to one or more external network elements. The external network elements may include a local network 322 coupled to one or more hosts 324, or a global network such as Internet 328 having one or more servers 330. The switching system 316 switches information traffic arriving on input interface 314 to output interface 319 according to pre-determined protocols and conventions that are well known. For example, switching system 316, in cooperation with processor 304, can determine a destination of a packet of data arriving on input interface 314 and send it to the correct destination using output interface 319. The destinations may include host 324, server 330, other end stations, or other routing and switching devices in local network 322 or Internet 328.

The techniques described herein are related to the use of computer system 300 for CFM auto-provisioning. According to one embodiment, CFM auto-provisioning is provided by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement the techniques described herein. Thus, embodiments of the techniques described herein are not limited to any specific combination of hardware circuitry and software.

The term "computer-readable medium" as used herein refers to any medium that participates in providing data that causes a machine to operate in a specific fashion. In an embodiment implemented using computer system 300, various computer-readable media are involved, for example, in providing instructions to processor 304 for execution. Such a medium may take many forms, including but not limited to storage media and transmission media. Storage media includes both non-volatile media and volatile media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine such as computer system 300.

Common forms of computer-readable storage media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other tangible storage medium from which a computer can read.

Various forms of computer-readable storage media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector coupled to bus 302 can receive the data carried in the infrared signal and place the data on bus 302. Bus 302 carries the data to main memory 306, from which processor 304 retrieves and executes the instructions. The instructions received by main memory 306 may optionally be stored on storage device 310 either before or after execution by processor 304.

Communication interface 318 also provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the techniques described herein, one such downloaded application provides for CFM auto-provisioning of network elements that provide a VPLS instance as described herein.

The received code may be executed by processor 304 as it is received, and/or stored in storage device 310, or other non-volatile storage for later execution. In this manner, computer system 300 may obtain application code in the form of a carrier wave.

5.0 Extensions and Alternatives

In the foregoing specification, embodiments of the present techniques have been described with reference to numerous specific details that may vary from implementation to implementation. Thus, the sole and exclusive indicator of what are the present techniques, as it is intended by the applicants, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus comprising:
at a first network element:
one or more processors;
Virtual Private LAN Service (VPLS) logic encoded in one or more non-transitory storage media for execution and when executed operable at least to:
receive and send configuration information for a VPLS instance by executing a Border Gateway Protocol (BGP) auto-discovery process that receives and sends the configuration information for the VPLS instance;
wherein the configuration information comprises a first value that uniquely identifies the VPLS instance and a plurality of second values that respectively and uniquely identify each of a plurality of second network elements that are operable to provide the VPLS instance;
configuration logic encoded in one or more non-transitory storage media for execution and when executed operable at least to:
automatically configure, at the first network element, based on the configuration information for the VPLS instance, a Connectivity Fault Management (CFM) association and a local maintenance endpoint (MEP) for the VPLS instance on the apparatus;
wherein to perform the automatic configuration, the configuration logic is further operable to:
based on the first value, determine a CFM identifier of the CFM association that is to be configured for the plurality of second network elements;
based on the plurality of second values, determine a plurality of MEP identifiers that uniquely identify a plurality of MEPs, in the CFM association, that are to be respectively configured on the plurality of second network elements;
based on a local value that uniquely identifies the apparatus in the VPLS instance, determine a local MEP identifier that uniquely identifies, in the CFM association, the local MEP that is to be configured at the apparatus;
configure the CFM association and the local MEP based at least on the CFM identifier of the CFM association, the local MEP identifier, and the plurality of MEP identifiers that uniquely identify the plurality of MEPs in the CFM association.

2. The apparatus of claim 1, wherein:
the first value and the plurality of second values are included in a BGP message that is received by the BGP auto-discovery process;
the first value is a VPLS identifier of the VPLS instance;
the plurality of second values is a plurality of Virtual Switching Interface (VSI) identifiers that respectively and uniquely identify the plurality of second network elements.

3. The apparatus of claim 1, wherein the configuration logic is further operable to generate the plurality of MEP identifiers by providing the plurality of second values to a mapping function.

4. The apparatus of claim 3, wherein:
the plurality of second values is an ordered sequence of values;
the mapping function is operable to use a predetermined number of bits from each particular value in the ordered sequence of values as a corresponding particular MEP identifier.

5. The apparatus of claim 3, wherein the mapping function is a hashing function that is operable to generate the plurality of MEP identifiers from the plurality of second values.

6. The apparatus of claim 3, wherein the mapping function is operable to:
arrange the plurality of second values in a particular order; and
assign the plurality of MEP identifiers as consecutive numbers that match the particular order.

7. The apparatus of claim 3, wherein the mapping function is a function that is used by the first network element and each of the plurality of second network elements to derive the same plurality of MEP identifiers.

8. The apparatus of claim 1, further comprising logic that is operable to invoke the configuration logic in response to a BGP message that is received by the BGP auto-discovery process.

9. The apparatus of claim 1, further comprising CFM logic that is operable to provide a CFM service through the local MEP, wherein the CFM service is operable to provide one or more of connectivity monitoring, fault verification, and fault isolation for the pseudowires over which the VPLS instance is established.

10. The apparatus of claim 1, wherein the local MEP is a Down MEP that is configured to connect to one or more pseudowires of the VPLS instance, or an Up MEP that is configured to connect to one or more network interfaces of the apparatus.

11. A computer-implemented method comprising:
at a first network element that is operable to provide a Virtual Private LAN Service (VPLS) instance, receiving and sending configuration information for the VPLS instance by executing, at the first network element, a Border Gateway Protocol (BGP) auto-discovery process that performs receiving and sending the configuration information for the VPLS instance; wherein the configuration information comprises a first value that uniquely identifies the VPLS instance and a plurality of second values that respectively and uniquely identify each of a plurality of second network elements that are operable to provide the VPLS instance;
based on the configuration information for the VPLS instance, automatically configuring a Connectivity Fault Management (CFM) association and a local maintenance endpoint (MEP) for the VPLS instance on the first network element by performing:
- based on the first value, determining a CFM identifier of the CFM association that is to be configured for the plurality of second network elements;
- based on the plurality of second values, determining a plurality of MEP identifiers that uniquely identify a plurality of MEPs, in the CFM association, that are to be respectively configured on the plurality of second network elements;
- based on a local value that uniquely identifies the first network element in the VPLS instance, determining a local MEP identifier that uniquely identifies, in the CFM association, the local MEP that is to be configured at the first network element; and
- configuring the CFM association and the local MEP based at least on the CFM identifier of the CFM association, the local MEP identifier, and the plurality of MEP identifiers that uniquely identify the plurality of MEPs in the CFM association;

wherein the method is performed by one or more computing devices.

12. The method of claim 11, wherein:
the first value and the plurality of second values are included in a BGP message that is received by the BGP auto-discovery process;
the first value is a VPLS identifier of the VPLS instance; and
the plurality of second values is a plurality of Virtual Switching Interface (VSI) identifiers that respectively and uniquely identify the plurality of second network elements.

13. The method of claim 11, wherein determining the plurality of MEP identifiers comprises executing a mapping function based on the plurality of second values.

14. The method of claim 13, wherein:
the plurality of second values is an ordered sequence of values;
executing the mapping function includes using a predetermined number of bits from each particular value in the ordered sequence of values as a corresponding particular MEP identifier.

15. The method of claim 13, wherein the mapping function is a hashing function that generates the plurality of MEP identifiers from the plurality of second values.

16. The method of claim 13, wherein executing the mapping function includes:
arranging the plurality of second values in a particular order; and
assigning the plurality of MEP identifiers as consecutive numbers that match the particular order.

17. The method of claim 11, wherein automatically configuring the CFM association and the local MEP is performed in response to receiving a BGP message by the BGP auto-discovery process.

18. The method of claim 11, further comprising:
receiving, at the first network element, second configuration information for a second VPLS instance that is to be provided by the plurality of second network elements; and
automatically configuring, at the first network element, a second CFM association and a second local MEP for the second VPLS instance based on the second configuration information for the second VPLS instance.

19. The method of claim 11, further comprising executing a CFM service through the local MEP, wherein the CFM service provides one or more of connectivity monitoring, fault verification, and fault isolation for the pseudowires over which the VPLS instance is established.

20. The method of claim 11, wherein the local MEP at the first network element is a Down MEP that is configured to connect to one or more pseudowires of the VPLS instance, or an Up MEP that is configured to connect to one or more network interfaces of the first network element.

21. An apparatus comprising:
at a first network element:
one or more processors;
Virtual Private LAN Service (VPLS) logic encoded in one or more non-transitory storage media for execution and when executed operable at least to receive and send configuration information for a VPLS instance by executing a Border Gateway Protocol (BGP) auto-discovery process that receives and sends the configuration information for the VPLS instance;
wherein the configuration information comprises a first value that uniquely identifies the VPLS instance and a plurality of second values that respectively and uniquely identify each of a plurality of second network elements that are operable to provide the VPLS instance;
means for automatically configuring, based on the configuration information for the VPLS instance, a Connectivity Fault Management (CFM) association and a local maintenance endpoint (MEP) for the VPLS instance on the apparatus;
wherein the means for automatically configuring further comprise:
- means for determining, based on the first value, a CFM identifier of the CFM association that is to be configured for the plurality of second network elements;
- means for determining, based on the plurality of second values, a plurality of MEP identifiers that uniquely identify a plurality of MEPs, in the CFM association, that are to be respectively configured on the plurality of second network elements;
- means for determining, based on a local value that uniquely identifies the apparatus in the VPLS instance, a local MEP identifier that uniquely identifies, in the CFM association, the local MEP that is to be configured at the apparatus; and
- means for configuring the CFM association and the local MEP based at least on the CFM identifier of the CFM association, the local MEP identifier, and the plurality of MEP identifiers that uniquely identify the plurality of MEPs in the CFM association.

22. The apparatus of claim 21, wherein:
the first value and the plurality of second values are included in a BGP message that is received by the BGP auto-discovery process;
the first value is a VPLS identifier of the VPLS instance;
the plurality of second values is a plurality of Virtual Switching Interface (VSI) identifiers that respectively and uniquely identify the plurality of second network elements.

23. The apparatus of claim 21, wherein the means for automatically configuring the CFM association and the local MEP further comprise means for generating the plurality of MEP identifiers by providing the plurality of second values to a mapping function.

24. The apparatus of claim 23, wherein the mapping function is a function that is used by each of the plurality of second network elements to derive the same plurality of MEP identifiers.

* * * * *